Aug. 2, 1966   T. M. DEAKIN ET AL   3,263,569
GEAR CUTTING METHODS

Filed March 6, 1964   2 Sheets-Sheet 1

Inventors
THOMAS MEYRICK DEAKIN
GEOFFREY EDWARD BROOME

By Norris + Bateman

Attorneys

Inventors
THOMAS MEYRICK DEAKIN
GEOFFREY EDWARD BROOME

By Norris + Bateman
Attorneys

United States Patent Office 3,263,569
Patented August 2, 1966

3,263,569
GEAR CUTTING METHODS
Thomas Meyrick Deakin and Geoffrey Edward Broome, London, England, assignors, by mesne assignments, to The Gear Grinding Company Limited, Warwickshire, England, a company of Great Britain
Filed Mar. 6, 1964, Ser. No. 349,991
Claims priority, application Great Britain, Mar. 16, 1963, 10,505/63
4 Claims. (Cl. 90—5)

This invention relates to an improved method of producing curved tooth bevel and hypoid gears and to a cutter system for carrying out said method.

It has previously been proposed to provide two superimposed intermeshing eccentrically-mounted face-mill cutters each of which is adapted to sweep out a surface consisting of a frustum of a cone. This cutter system enables curved tooth bevel and hypoid gears having teeth and tooth gaps which taper in width towards their apex point to be generated in a single operation, but in order to avoid the occurrence of the condition known in the art as "mis-matching" or "bias bearing" between two gears so produced when in mesh it is necessary to make the tooth gaps of constant depth, that is to say to make the respective surfaces of the tip or face cone and of the root cone parallel to one another in a section containing the gear axis.

The object of the present invention is to enable curved tooth bevel and hypoid gears having teeth and tooth gaps which taper both in width and in depth towards their apex point to be generated in a single operation without causing any mis-matching between two mating gears so produced when in mesh.

According to one aspect of the invention, a method of producing generated curved tooth bevel and hypoid gears having teeth and tooth gaps which taper both in width and in depth towards their apex point comprises employing two superimposed, intermeshing, eccentrically-mounted face-mill cutters, each adapted to sweep out a surface consisting of a zone of a sphere, positioning the axes of the face-mill cutters relative to another axis such that the face-mill cutters sweep out tooth surfaces of an imaginary basic crown wheel mounted for rotation about said other axis, and effecting relative rolling motion of the pitch plane of said imaginary basic crown wheel and the pitch cone of a corresponding bevel or hypoid gear blank in which tooth gaps are being cut.

According to another aspect of the invention, two superimposed intermeshing eccentrically-mounted face-mill cutters are each adapted to sweep out a surface consisting of a zone of a sphere.

In the accompanying diagrammatic drawings, which are by way of example only:

Figure 1:
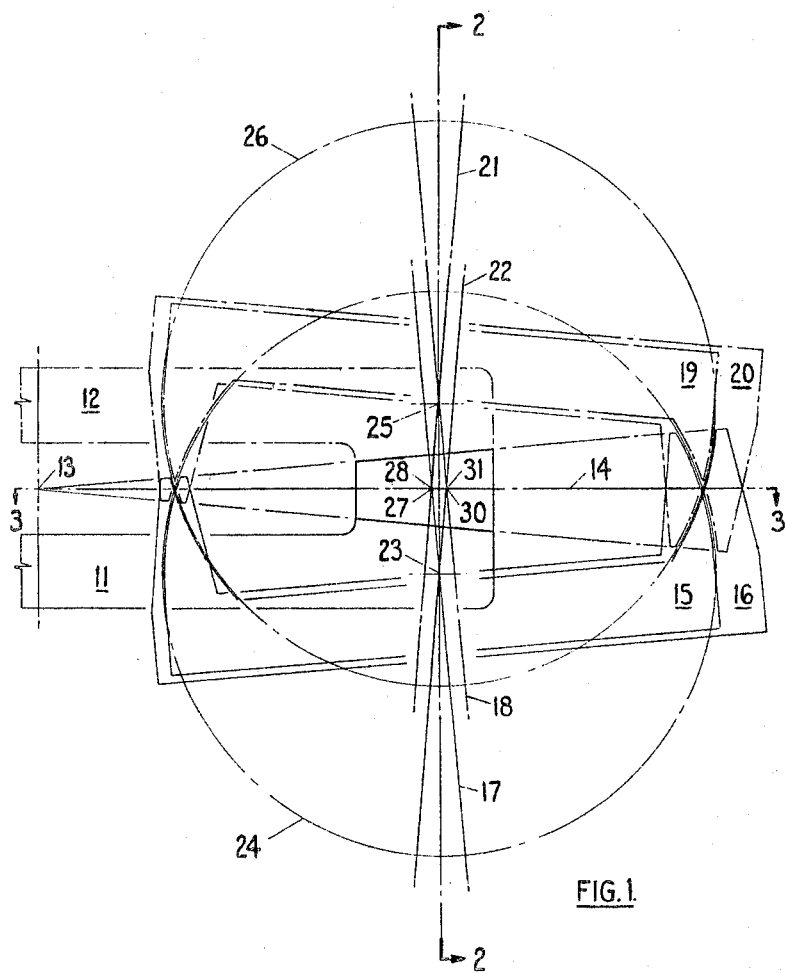
FIG. 1 shows two pairs of intermeshing face-mill cutters representing conjugate imaginary basic crown wheels, one for generating each of a pair of bevel gears.

Referring now to the drawings, two conjugate imaginary basic crown wheels 11 and 12 (see FIG. 1) have teeth and tooth gaps which taper both in width and in depth towards an apex point 13. That is to say, 13 is the apex point of the tip or face cones, the pitch cones (which constitute a common pitch plane 14) and the root cones of both of the basic crown wheels 11 and 12. A convex tooth flank 8 (see FIG. 3) of the basic crown wheel 11 is represented by the surface swept out by a face-mill cutter 15, and a concave tooth flank 9 of the crown wheel 11 is represented by the surface swept out by another face-mill cutter 16. The cutters 15 and 16 are disposed on a gear-cutting machine in superimposed intermeshing relationship, their respective axes 17 and 18 being eccentrically mounted relative to one another (see FIGS. 1 and 2). Similarly, a convex tooth flank 6 of the basic crown wheel 12 is represented by the surface swept out by a face-mill cutter 19 and a concave tooth flank 7 of the crown wheel 12 is represented by the surface swept out by a face-mill cutter 20. The face-mill cutters 19 and 20 are superimposed, intermeshing and eccentrically-mounted relative to one another, and their respective axes are designated 21 and 22. The axes 17 and 22 pass through the centre 23 of an imanginary sphere 24 (see FIG. 1), and the axes 18 and 21 likewise pass through the centre 25 of an imaginary sphere 26. The cutters 15 and 20 each sweep out a zone of the sphere 24, and the cutters 16 and 19 each sweep out a zone of the sphere 26. It will therefore be readily appreciated that the tilt (see FIG. 1) of the cutter system 15, 16 to enable the plane containing the cutter tips to be tangential to the tip or face cone of the basic crown wheel 11, and the corresponding tlit in the opposite direction of the cutter system 19, 20, will not result in any mis-matching between a gear produced by the cutter system 15, 16 and a gear produced by the cutter system 19, 20 when said gears are in mesh.

Figure 2:
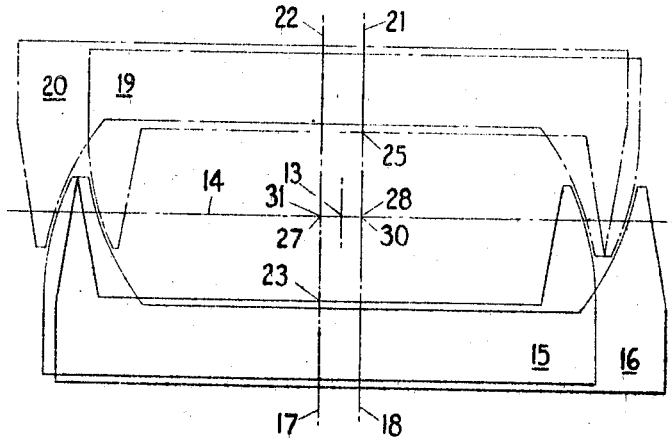
FIG. 2 is a section on the line 2—2 in FIG. 1.
Figure 3:
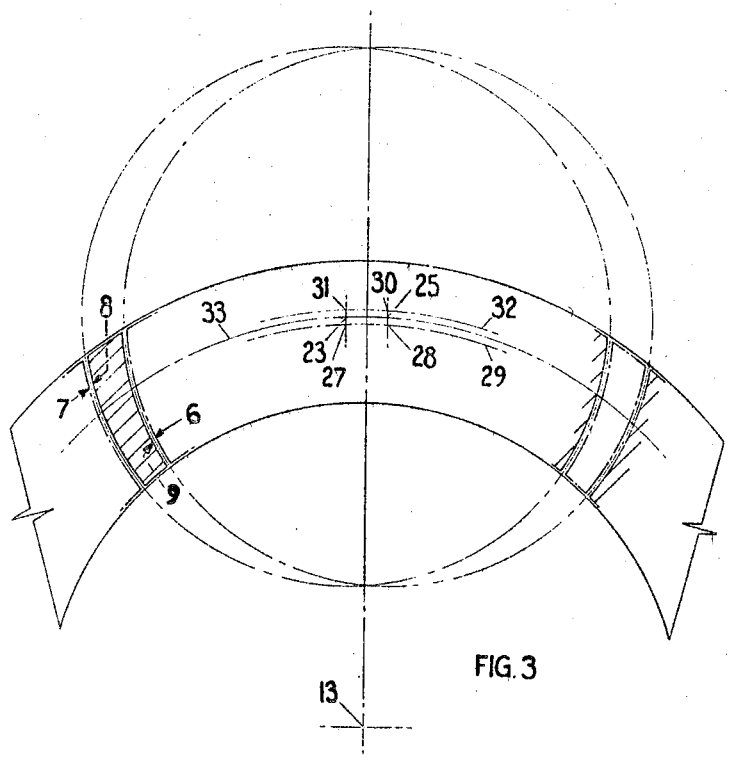
FIG. 3 is a section on the line 3—3 in FIG. 1.

The axes 17 and 21 pass through the common pitch plane 14 of the basic crown wheels 11 and 12 at respective points 27 and 28 both of which lie on an arc 29 having its centre at 13, and the axes 18 and 22 pass through said plane at respective points 30 and 31 both of which lie on another arc 32 also having its centre at 13. In FIG. 3 the centres 23 and 25 of the respective spheres 24 and 26 are shown on a common arc 33 which also has its centre at 13. Reference to FIGS. 1 and 2 will make it clear, however, that in FIG. 3 the centre 23 is below the plane of the paper (which represents the plane 14) and the centre 25 is above said plane.

To enable the cutter systems 15, 16 and 19, 20 to trace out teeth of a required thickness at any required tip or face cone angle, the distance between the axes of each cutter system is adjustable. In FIG. 3 it can be seen that the cutter systems 15, 17 and 19, 20 can trace out teeth of either right or left hand as required. In FIG. 2 it can be seen that the cutter system 15, 16 is emulating a tooth on the left hand side of the figure and a tooth space on the right hand side thereof, whilst the cutter system 19, 20 is emulating a tooth space on the left and a tooth on the right.

It will of course be realised that the two cutter systems 15, 16 and 19, 20 are shown merely to illustrate the purpose of the part-spherical profile of the cutting edges of the face-mill cutters, and that only one of said cutter systems is required to produce both gears of a pair by subsequent operations on the same machine, appropriate adjustment of the machine being effected between said operations.

The invention, as thus far described, produces perfectly matched teeth, a condition not often desirable in practice. Limited tooth contact (not to be confused with bias bearing) is achieved by using different sphere radii for mating flanks, and the position of the contact area is adjusted by appropriate variation of the relative positions of the sphere centres.

The invention is particularly adapted for use with either of the machines described and illustrated in our co-pending applications for Patent Nos. 234,701 and 249,645.

What we claim is:

1. A method of producing generated curved tooth bevel and hypoid gears having teeth and tooth gaps which taper both in width and in depth towards their apex point which comprises providing on parallel axes two simultaneously operable, super-imposed, intermeshing, eccentrically-mounted face-mill cutters, each adapted to sweep out a surface consisting of a zone of a sphere, positioning the axes of the face-mill cutters relative to another axis such that the face-mill cutters sweep out tooth surfaces of an imaginary basic crown wheel mounted for rotation about said other axis, and effecting relative rolling motion of the pitch plane of said imaginary basic crown wheel and the pitch cone of a corresponding gear blank in which tooth gaps are being cut.

2. A system for cutting bevel or hypoid teeth of tapering depth comprising two superimposed, intermeshing, eccentrically-mounted, concurrently operated, parallel axis face-mill cutters, each adapted to sweep out a surface consisting of a zone of a sphere.

3. A system according to claim 2, wherein the distance between the axes of the two face-mill cutters is adjustable.

4. A cutter system according to claim 2 wherein said axes are angularly adjustable, whilst remaining parallel to one another, to enable the plane containing the cutter tips to be tangential to a cone of any required angle.

References Cited by the Examiner

UNITED STATES PATENTS

| | | | |
|---|---|---|---|
| 1,625,402 | 4/1927 | Sloan | 90—9.6 X |
| 2,107,460 | 2/1938 | Wildhaber | 90—5 |
| 2,260,605 | 10/1941 | Carlsen | 90—5 |
| 2,881,665 | 4/1959 | Krumme | 90—9.6 X |

FOREIGN PATENTS 902,282   8/1962   Great Britain.

OTHER REFERENCES

37–17447, 10–1962, Japan (Koizumi), patent application publication.

WILLIAM W. DYER, JR., *Primary Examiner.*

G. A. DOST, *Assistant Examiner.*